United States Patent Office 3,137,720
Patented June 16, 1964

3,137,720
TRIMETHYLSILYL SUBSTITUTED PHENOLS
Glenn D. Cooper, Schenectady, N.Y., assignor to General
Electric Company, a corporation of New York
No Drawing. Filed May 19, 1961, Ser. No. 111,168
9 Claims. (Cl. 260—448.2)

This invention is concerned with a process for making trimethylsilyl-substituted phenols and compositions derived therefrom. More particularly, the invention relates to a process for making a phenol having at least one nuclearly bonded trimethylsilyl [—Si(CH₃)₃] group which comprises reacting with an alkali-metal alkoxide, e.g., an alkali-metal methoxide, an aromatic compound, e.g., a benzene, containing both a nuclearly-bonded tri-methylsiloxy [—OSi(CH₃)₃] group and the aforesaid —Si(CH₃)₃ group, where the —Si(CH₃)₃ group is in proximity to at most one —OSi(CH₃)₃ group in one of the following positions: ortho, para, thereby to convert the —OSi(CH₃)₃ group to a nuclearly-bonded hydroxyl group, there being at least two hydrogen atoms on the aromatic nucleus, and any other group on the aromatic nucleus of the starting compound being selected from the class consisting of the —Si(CH₃)₃ and —OSi(CH₃)₃ groups, and thereafter reacting the mixture with water to effect formation of the phenol derivative. The invention also includes compositions selected from the class consisting of trimethylsilylhydroquinone, 4-trimethyl-silylcatechol, (trimethylsilyl)benzoquinone-1,4, and 2,4,6-tris(trimethylsilyl) phenol.

The structural formulas for the compositions embraced within the scope of the present invention are as follows:

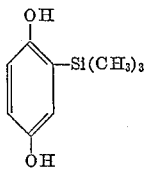

trimethylsilylhydroquinone

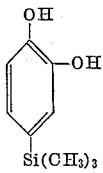

4-trimethylsilylcatechol

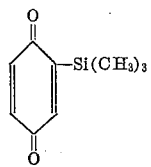

(trimethylsilyl)benzoquinone-1,4

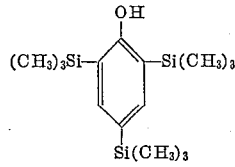

2,4,6-tris-(trimethylsilyl)phenol

Mono-(trimethylsilyl) phenols have been prepared in the past as shown, for instance, in an article by J. L. Speier, Journal of the American Chemical Society, 74, 1003 (1952), and in an article by R. A. Benkeser and H. R. Krysiak, Journal of the American Chemical Society, 75, 2421 (1953). However, successful attempts to prepare phenols having more than one trimethylsilyl substituent in the ring have not been reported, and particularly attempts to prepare compounds of this type by hydrolysis of the corresponding aryloxy trimethyl silane have led to cleavage of arylsilicon bonds of the trimethyl silyl group. In addition to the above, no dihydric phenols having tri-methylsilyl substituents on the ring have been reported. Attempts have been made to obtain 4-(trimethylsilyl) resorcinol, by hydrolysis of 2,4-bis-(trimethylsiloxy)-tri-methylsilyl benzene, but these attempts were unsuccessful because of nuclear desilylation during hydrolysis, as is shown in the above-mentioned Speier article.

Unexpectedly, I have discovered that I am able to prepare quite readily and in good yields phenols having more than one trimethylsilyl substituent in the ring and not only that, but I am also able to prepare dihydroxy benzenes containing a trimethylsilyl group by reacting a trimethyl-silyl-substituted benzene containing a —OSi(CH₃)₃ group with an alkali-metal alkoxide of the formula XOR where X is an alkali metal and R is methyl, ethyl, or propyl groups, (e.g., sodium methoxide, sodium ethoxide, potassium methoxide, cesium methoxide, etc.) whereby after dilution with water the —OSi(CH₃)₃ group is converted to a nuclearly-bonded hydroyl group, without adversely affecting the trialkylsilyl groups attached directly to the nucleus of the benzene ring. By means of this process, I am able to prepare compounds which in the past have been either unreported or have been unable to be prepared by the methods previously available.

It was entirely unexpected and in no way could have been predicted that my above-described process could be used to make trimethylsilyl compositions of the class hereinbefore described. The criticality of such a process is emphasized by the fact that, whereas as pointed out in the aforementioned Speier et al. article, they were unable to make 2,4-bis(trimethylsilyl)phenol, on the other hand, employing my process, I was able to obtain this compound quite readily from 2,4-bis-trimethylsilyl)phenoxy-trimethylsilane. The criticality of the positions of the tri-methylsiloxy groups to the hydroxyl groups is illustrated by the fact that I was unable to make 4-trimethylsilyl resorcinol because more than one hydroxy group was ortho or para to the trimethylsilyl group.

The starting benzene derivatives which are employed in the practice of the present invention may be considered as a benzene nucleus containing at least one silicon-bonded trimethylsilyl group and at least one silicon-bonded tri-methylsiloxy group, there being present at least two hydrogen atoms on the benzene ring, and any valences on the benzene nucleus which are unsatisfied by either of the above two groups are satisfied by hydrogen. In order to obtain the desired compounds and to reduce desilylation, it is essential that not more than one —OSi(CH₃)₃ group be either in the ortho or para positions to the —Si(CH₃)₃ group or groups.

Included among the aromatic compounds which may be employed as the starting materials are compounds having the generic formula

I

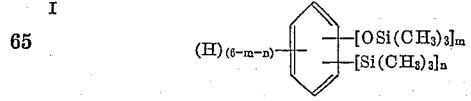

where m is a whole number equal to from 1 to 2, n is a whole number equal to from 1 to 3, and the sum of $m+n$ is at most 4, there being at most one —OSi(CH$_3$)$_3$ group ortho or para to any —Si(CH$_3$)$_3$ group.

Included among the compounds which may be represented by Formula I are, for instance, 2,4-bis-(trimethylsilyl) trimethylsiloxybenzene, 2,6-bis-(trimethylsilyl) trimethylsiloxy benzene, 2,4,6-tris(trimethylsilyl) trimethylsiloxy benzene, 2,4-bis(trimethylsiloxy)trimethylsiloxy benzene, 2,5-bis(trimethylsiloxy)-trimethylsilyl benzene, 3,4-bis-(trimethylsiloxy) trimethylsilyl benzene, etc.

In carrying out the process herein described and in preparing the compositions disclosed and claimed in the instant application, the chlorinated derivatives of the various hydroxy benzenes were first prepared, and then converted to the corresponding trimethylsilyl ethers by reaction of the hydroxy group with trimethylchlorosilane. The ring chlorine was then replaced by a trimethylsilyl group following procedures described in the aforementioned Speier and Benkeser et al. articles. Conversion of the trimethylsilyl ethers to the corresponding trimethylsilyl-substituted phenols by reaction with sodium methoxide was carried out as follows. The trimethylsilyl-substituted benzene containing the trimethylsiloxy group or groups was swept thoroughly with nitrogen and thereafter a 1 to 5 molar concentration of an alkali-metal alkoxide, for example, sodium methoxide, sodium ethoxide, etc., in a non-aqueous solvent, e.g., methanol, ethanol, etc., was added. At least 1 mole of the alkali-metal alkoxide should be used for each siloxy group to be converted to a hydroxy group. After stirring the mixture for a period of time ranging from one minute to several hours at from below room temperature (i.e., below about 20–25° C.) to around room temperature, such temperatures being the only ones required generally (although elevated temperatures of from 30 to 50° C. or somewhat higher may be used), preferably under a nitrogen blanket, the mixture is then added to a large amount of water, preferably at least one mole and advantageously from 5 to 100 or more moles water per trimethylsiloxy group. In some cases it may be desirable to neutralize the solution by dropwise addition of an acid, for instance, acetic acid. The desired phenol is then isolated by suitable means, such as, by extraction with a solvent or by filtering.

In order that those skilled in the art may better understand how the present invention may be practiced, the following examples are given by way of illustration and not by way of limitation.

In the following examples, first the hydroxy group of the chlorophenol was converted to the trimethylsilyl ether derivative by refluxing the chlorophenol with a molar excess of trimethylchlorosilane; the ether was then purified by fractional distillation under reduced pressure. Reaction (by means of a Wurtz synthesis) of the chlorosubstituted trimethylsiloxybenzene with sodium and trimethylchlorosilane in toluene at reflux conditions effected substitution of the chlorine with a trimethylsilyl group and yielded a trimethylsilyl-substituted trimethylsiloxybenzene. Using the preparation of 4-trimethylsilylcatechol for illustrative purposes only, the procedure for making the compositions herein described proceeded in accordance with the following equations, it being understood, that this same synthesis was used for the other phenols having trimethylsilyl groups:

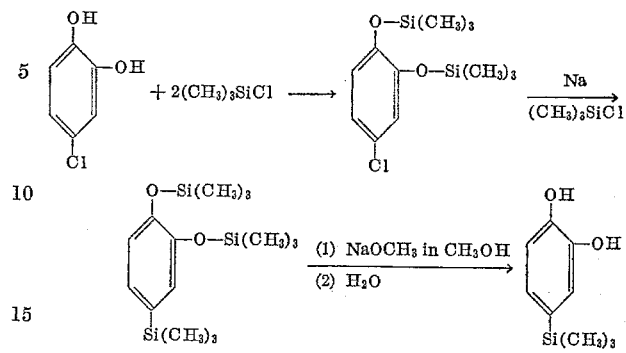

The following table shows some of the intermediate chlorophenols and aryloxytrimethylsilanes prepared in the above fashion by my process, together with some of the properties of these compositions.

TABLE I

| Compound | B.P. | | $N_D^{20}$ | C, Percent | | H, Percent | | Si, Percent | |
|---|---|---|---|---|---|---|---|---|---|
| | ° C. | Mm. | | Calcd. | Found | Calcd. | Found | Calcd. | Found |
| 2,5(Me$_3$SiO)$_2$C$_6$H$_3$Cl | 81 | 0.2 | 1.4822 | 49.9 | 49.9 | 7.3 | 7.7 | 19.4 | 18.7 |
| 3,4(Me$_3$SiO)$_2$C$_6$H$_3$Cl | 92 | 0.3 | 1.4820 | 49.9 | 50.1 | 7.3 | 7.9 | 19.4 | 19.6 |
| 2,5(Me$_3$SiO)$_2$C$_6$H$_3$SiMe$_3$ | 93 | 0.4 | 1.4761 | 55.2 | 55.6 | 9.3 | 9.3 | 25.8 | 26.0 |
| 3,4(Me$_3$SiO)$_2$C$_6$H$_3$SiMe$_3$ | 93 | 13.0 | 1.4720 | 55.2 | 55.3 | 9.3 | 9.0 | 25.8 | 26.3 |

Designation "Me" means —CH$_3$.

*Example 1*

In this example, a solution of 3.87 grams (0.0125 mole) of 2,4-bis-(trimethylsilyl)phenoxytrimethylsilane [1] (boiling point 142°/12 mm., $n_D^{20}$ 1.4865) in 30 ml. of 2 M sodium methoxide in methanol was allowed to stand for about 18 hours at about 5° C. This mixture was then diluted with 115 ml. of water and extracted with n-pentane. The pentane solution was dried over sodium sulfate and then evaporated yielding a colorless liquid. Further purification of the crystals from n-hexane gave the compound 2,4-(bis(trimethylsilyl) phenol melting at 36.5–37° C. Analysis of this compound showed it to contain 60.5% carbon, 9.5% hydrogen, 23.1% silicon, as contrasted to the theoretical values of 60.4% carbon, 9.3% hydrogen, and 23.6% silicon.

*Example 2*

A solution of 7.74 grams (0.0249 mole) of 2,6-bis-(trimethylsilyl)-phenoxytrimethylsilane [2] in 60 ml. of 2M sodium methoxide in methanol was allowed to stand for 18 hours at a temperature of about 5° C. The solution was then diluted with 300 ml. water and extracted with n-pentane as in Example 1. Evaporation of the pentane yielded 4.83 grams of the compound 2,6-bis-(trimethylsilyl)phenol which was a colorless liquid having a refractive index of $n_D^{20}$ 1.5066. Analysis of the compound showed it contained 60.4% carbon, 9.3% hydrogen, and 23.9% silicon, as contrasted to the theoretical values of 60.4% carbon, 9.3% hydrogen, and 23.6% silicon.

*Example 3*

In this example a suspension of 113 grams of sodium in 325 ml. toluene was heated under reflux with vigorous stirring while a mixture of 201 grams (0.75 mole) of 2,4,6-trichlorophenoxytrimethylsilane [prepared by reacting 2,4,6-trichlorophenol with (CH$_3$)$_3$SiCl] and 265 grams

---

[1] Prepared by reacting 2,4-dichlorophenol with (CH$_3$)$_3$SiCl and reacting the 2,4-dichlorophenoxytrimethylsilane with (CH$_3$)$_3$SiCl in the presence of sodium.
[2] Prepared by reacting 2,6-dichlorophenol with (CH$_3$)$_3$SiCl and reacting the 2,6-dichlorophenoxytrimethylsilane with (CH$_3$)$_3$SiCl in the presence of sodium.

(2.45 mole) of trimethylchlorosilane was added slowly through a dropping funnel. After about one-half of the mixture had been added, 100 ml. of toluene was added to the thick slurry and the addition was continued. When addition had been completed (approximately 2 hours), 200 ml. of toluene was added and heating at reflux temperature was continued for 45 minutes. The mixture was cooled and filtered and the filtrate was distilled to give a fraction which solidified upon standing. Recrystallization from methanol yielded 19.3 grams of pure 2,4,6-tris-(trimethylsilyl)phenoxytrimethylsilane having a melting point of 63.5–64.0° C.

*Example 4*

Using the ether compound prepared in Example 3, a solution of 7.5 grams (0.0196 mole) of 2,4,6-tri(trimethylsilyl)phenoxytrimethylsilane in 50 ml. of 2 M sodium methoxide in methanol was allowed to stand for 18 hours at 5° C., then diluted with 250 ml. of water and extracted with n-pentane. Evaporation of the pentane yielded a colorless liquid, which upon standing deposited colorless crystals. Recrystallization of the crystals from n-hexane yielded 2,4,6-tris-(trimethylsilyl)-phenol having a melting point of 41–42° C. Analysis of this compound showed it to contain 58.0% carbon, 9.7% hydrogen, and 26.8% silicon, as contrasted to the theoretical value of 58.0% carbon, 9.7% hydrogen and 27.1% silicon.

*Example 5*

In this example, 3.26 grams (0.01 mole) of 2,5-bis-(trimethylsiloxy)-trimethylsilylbenzene [prepared by reacting chlorohydroquinone with $(CH_3)_3SiCl$ and then reacting the resulting ether derivative with $(CH_3)_3SiCl$ in the presence of sodium] was swept with nitrogen and 6.5 ml. of a 4.5 molar solution of sodium methoxide in methanol was added. A precipitate of colorless plates formed immediately. The mixture was shaken and allowed to stand for 1 hour at room temperature (about 23° C.). This mixture was then added while still under nitrogen to 100 ml. of water. The solution was neutarlized by dropwise addition of acetic acid and a precipitate of long, faintly blue needles was filtered off, washed with cold water and dried under vacuum to yield 1.24 grams (68% yield) of trimethylsilyl hydroquinone having a melting point of 126–127° C. Recrystallization of this material from n-hexane removed the blue color but did not change the melting point. Analysis of the compound showed it contained 59.7% carbon, 8.0% hydrogen, and 15.4% silicon, as contrasted with the theoretical values of 59.3% carbon, 7.7% hydrogen, and 15.4% silicon.

*Example 6*

A mixture of 3.26 grams (0.01 mole) of 3,4-bis-(trimethylsiloxy)trimethylsilyl benzene [made by reacting 4-chlorocatechol with $(CH_3)_3SiCl$ and then reacting the 4-chloro ether derivative with $(CH_3)_3SiCl$ in the presence of sodium] in 6.5 ml. of 4.5 molar sodium methoxide solution was allowed to stand under nitrogen at room temperature for 5 minutes and was then diluted with 100 ml. of water and neutralized with acetic acid as in the preceding Example 5. A liquid separated with was extracted with 100 ml. of diethyl ether. After washing the extract, and after removal of the ether, there remained a liquid which was dissolved in 20 ml. of n-pentane, treated with decolorizing carbon and the pentane solution was cooled to −20° C. The colorless plates which separated were filtered off, washed with cold pentane and dried under vacuum to yield pure 4-(trimethylsilyl) catechol having a melting point of 33–35° C. Analysis of the compound showed it to contain 59.7% carbon, 7.9% hydrogen and 14.8% silicon, as contrasted to the theoretical values of 59.3% carbon, 7.7% hydrogen, and 15.4% silicon.

*Example 7*

A solution of 1 gram of trimethylsilyl hydroquinone (prepared above in Example 5) in 60 ml. diethyl ether was stirred for 2 hours with 5 grams of silver oxide and 5 grams of anhydrous sodium sulfate. The mixture was filtered and the ether evaporated under vacuum leaving behind a yellow solid. Vacuum sublimation of this material yielded bright yellow crystals of (trimethylsilyl) benzoquinone-1,4 having a melting point of 67–68° C. Analysis of the compound showed it to contain 59.8% carbon, 6.7% hydrogen, and 15.3% silicon, as contrasted to the theoretical values of 60.0% carbon, 6.7% hydrogen, and 15.6% silicon.

It will of course be apparent to those skilled in the art that, in addition to the preparation of the trimethylsilyl compounds described above, other compounds may be prepared in accordance with the practice of my invention, starting with various other intermediates designed to yield the desired trimethylsilyl ether, and then preparing the desired trimethylsilyl phenol. The conditions of reaction may be varied widely, as may the proportions of ingredients; the proportion of the alkali-metal alkoxide may be varied considerably but generally is within the range of from about 1 to 5 moles of the alkali-metal alkoxide per trimethylsiloxy group, which by means of the alkali-metal alkoxide and water is converted to the same compound containing a nuclearly substituted hydroxy group in place of the trimethylsiloxy group.

The compositions herein described have various uses. Among these uses may be mentioned as stabilizers, for example, as oxidation and light stabilizers, for various polymeric materials such as, for instance, polyethylene, polypropylene, polyvinyl chloride, polyvinylidene chloride, etc. When employing the above-described compositions as stabilizers, they may be used in amounts ranging from about 0.001 to 2% of the weight of the polymer in which they are incorporated. The compositions of the present invention may also be used as intermediates in various organic syntheses to make polymers therefrom. Thus the benzoquinone herein disclosed and claimed can undergo Diels-Alder reactions. In addition, one can make polycarbonate resins which are useful in the insulating and coating arts by reacting, for instance, a trimethylsilyl hydroquinone with phosgene to give polymeric compositions composed of recurring units containing trimethylsilyl groups attached to the phenol nucleus as is illustrated in the following equation:

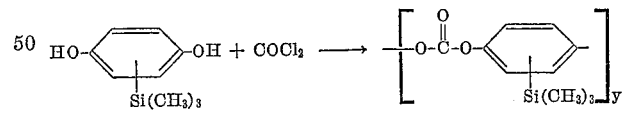

where y is a whole number greater than 1, e.g., from 2 to 1000 or more.

What I claim as new and desire to secure by Letters Patent of the United States is:

1. A trimethylsilyl compound selected from the class consisting of trimethylsilyl hydroquinone, 4-trimethylsilyl catechol, and 2,4,6-tris-(trimethylsilyl)phenol.
2. The compound trimethylsilyl hydroquinone.
3. The compound 4-trimethylsilyl catechol.
4. The compound 2,4,6-tris-(trimethylsilyl)-phenol.
5. The process for making a phenol having a nuclearly-bonded $-Si(CH_3)_3$ group which comprises reacting with an alkali-metal alkoxide a compound having the formula

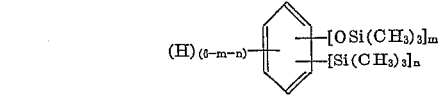

where m is a whole number equal to from 1 to 2, n is a whole number equal to from 1 to 3, and the sum of $m+n$ is at most 4, there being at most one $-OSi(CH_3)_3$ group ortho or para to any $-Si(CH_3)_3$ group, combining the reaction mixture with an amount of water equal to at least 1 mole of water for each trimethylsiloxy group, and thereafter isolating a phenol having the aforesaid nuclearly-bonded trimethylsilyl group.

6. The process as in claim 5 in which the alkali-metal alkoxide is sodium methoxide dissolved in methanol.

7. The process which comprises reacting sodium methoxide with 2,5-bis(trimethylsiloxy)trimethylsilyl benzene, combining the latter reaction mixture with an amount of water equal to at least one mole water per trimethylsiloxy group, and thereafter isolating the compound trimethylsilylhydroquinone.

8. The process which comprises reacting sodium methoxide with 3,4-bis(trimethylsiloxy) trimethylsilyl benzene, combining the latter reaction mixture with an amount of water equal to at least one mole water per trimethylsiloxy group, and thereafter isolating the compound 4-trimethylsilyl catechol.

9. The process which comprises reacting sodium methoxide with 2,4,6-tris(trimethylsilyl) trimethylsiloxy benzene, combining the latter reaction mixture with an amount of water equal to at least one mole water per trimethylsiloxy group, and thereafter isolating the compound 2,4,6-tris-(trimethylsilyl)phenol.

References Cited in the file of this patent

UNITED STATES PATENTS

| | | |
|---|---|---|
| 2,678,938 | Frisch | May 18, 1954 |
| 2,759,959 | Frisch | Aug. 21, 1956 |
| 2,886,577 | Fan | May 12, 1959 |
| 2,927,932 | Preston | Mar. 8, 1960 |
| 2,935,518 | Reetz | May 3, 1960 |

OTHER REFERENCES

Speier: "Jour. American Chem. Soc.," vol. 74, 1952, pp. 1003–10.

Cooper: "Jour. Organic Chem.," vol. 26, 1961, pp. 925–9.

Cooper et al.: ibid, vol. 26, 1961, pp. 4171–3.